United States Patent [19]

Ito et al.

[11] Patent Number: 5,997,780
[45] Date of Patent: Dec. 7, 1999

[54] ZERO POINT ADJUSTING METHOD FOR PRESSURE DETECTOR OF AN INJECTION MOLDING MACHINE AND AN APPARATUS THEREFOR

[75] Inventors: Susumu Ito, Oshino-mura; Masao Kamiguchi, Minamitsuru-gun; Noriaki Neko, Fujiyoshida; Katsuyuki Yamanaka; Toshiaki Ichihara, both of Oshino-mura, all of Japan

[73] Assignee: Fanuc Ltd, Minamitsuru, Japan

[21] Appl. No.: 08/860,457

[22] PCT Filed: Oct. 25, 1996

[86] PCT No.: PCT/JP96/03124

§ 371 Date: Jun. 23, 1997

§ 102(e) Date: Jun. 23, 1997

[87] PCT Pub. No.: WO97/15431

PCT Pub. Date: May 1, 1997

[30] Foreign Application Priority Data

Oct. 25, 1995 [JP] Japan .................................. 7-301990

[51] Int. Cl.[6] .................................................. B29C 45/76
[52] U.S. Cl. ........................ 264/40.5; 73/766; 264/328.1; 425/145; 425/149; 425/170
[58] Field of Search .................................. 264/40.1, 40.5, 264/328.1; 425/145, 146, 149, 170; 364/475.02, 475.05, 475.08, 571.01, 571.03, 571.05; 73/765, 766, 708, 726

[56] References Cited

U.S. PATENT DOCUMENTS

| | | | |
|---|---|---|---|
| 4,547,859 | 10/1985 | Wiggins | 364/571.05 |
| 5,206,034 | 4/1993 | Yamazaki | 264/40.5 |
| 5,213,726 | 5/1993 | Ramsey et al. | 264/40.5 |
| 5,553,481 | 9/1996 | Arai | 364/571.05 |
| 5,567,367 | 10/1996 | Ito et al. | |

FOREIGN PATENT DOCUMENTS

| | | |
|---|---|---|
| 2-88209 | 3/1990 | Japan . |
| 3-221428 | 9/1991 | Japan . |
| 7-205229 | 8/1995 | Japan . |

*Primary Examiner*—Jill L. Heitbrink
*Attorney, Agent, or Firm*—Staas & Halsey

[57] ABSTRACT

A zero point adjusting method and apparatus for a pressure detector of an injection molding machine, capable of carrying out a zero point adjustment of the pressure detector when external loads acting on the pressure detector are completely removed without disassembling an injection mechanism. An advance limit position Qf and a retreat limit position Qb of a screw are detected by driving the screw with a low output to determine an intermediate position Pm. By moving the screw to the intermediate position Pm, a resin reaction force acting directly on the screw is removed. Reciprocating motion in which an amplitude decreases gradually is imparted to the screw, thereby causing a backlash, having equal plays in the advance and retreat directions, between a ball nut and a ball screw. Then, the zero point adjustment of the pressure detector is made.

22 Claims, 8 Drawing Sheets

FIG. 8

|   | CORRECTION AMOUNT | CORRECTION DATE | NUMBER OF SHOTS | TIME FOR MOVEMENT |
|---|---|---|---|---|
| 1 | A1 | B1 | C1 | D1 |
| 2 | A2 | B2 | C2 | D2 |
|   |    |    |    |    |
| N | AN | BN | CN | DN |

ZERO POINT ADJUSTING METHOD FOR PRESSURE DETECTOR OF AN INJECTION MOLDING MACHINE AND AN APPARATUS THEREFOR

FIELD OF THE INVENTION

The present invention relates to a method of adjusting a zero point of a pressure detector of an injection molding machine and an apparatus for carrying out the method.

DESCRIPTION OF THE RELATED ART

An injection molding machine, in which a pressure applied to a movable member is detected by a pressure detector provided corresponding to the movable member, is known. For example, a machine, in which an injection holding pressure or a back pressure in metering is sampled by a pressure detector installed on the base of screw, is well known. The most commonly used pressure detector is a load cell, that is a pressure detector comprising an elastic member and a strain gauge positioned on a power transmitting path between a movable member and a drive source of the movable member.

Since the strain gauge is designed to measure a deformation of metallic wire caused by pressure by changing the deformation into an electric resistance, a pressure applied to the movable member can be detected by directly affixing the strain gauge to the functionally necessary elastic member positioned on a power transmitting path between the movable member and the drive source or the movable member itself and the like. However, when the rigidity of such an elastic member is extremely high and therefore the deformation due to pressure is not sufficiently large, it is sometimes difficult to detect the pressure with high accuracy. Because of this problem, a member which is more elastically deformable, called a strain-sensitive member, is usually disposed on the power transmitting path, and a strain gauge is affixed to this member in order to constitute a pressure detector.

In general, the strain-sensitive member or the load cell body means the aforesaid member which is easily elastically deformable. Needless to say, the strain gauge itself is also a kind of strain-sensitive member.

As an example of the pressure detector using the load cell, a general construction of the pressure detector which is adapted to detect pressure applied to a screw shaft will be described briefly with reference to FIG. 1, which shows a cross section of a principal portion of an injection mechanism.

In FIG. 1, reference numeral 1 denotes a front plate of an injection unit. Fixed to the front plate 1 are two or four tie rods 2 provided between the front plate 1 and a rear plate (not shown) positioned on the right side in the figure. A screw pusher plate 3 is slidably installed to the tie rod 2 through bushings etc.

A screw sleeve 4, which is rotatably installed to the screw pusher plate 3 through two angular bearings, is rotated by a metering motor (not shown), which is fixed to the screw pusher plate 3 side, through a toothed pulley 5 fixed to the sleeve 4 and a timing belt (not shown) etc. set around the pulley 5.

An injection cylinder 6 fixed to the front surface of the front plate 1 incorporates a screw 7 for metering and injection, and the base of the screw 7 is fixed to the screw sleeve 4. The screw is rotated for metering and kneading in response to the rotation of the screw sleeve 4.

Further, a ball screw 8, which is used as a screw for motion, is attached to the rear plate, not shown, stationarily in the axial direction but rotatably around the axis. The ball screw 8 can be rotated by an injection motor fixed on the rear plate side through a timing belt and the like. The front end portion of the ball screw 8 protruding from the rear plate toward the front plate 1 is screwed into a ball nut 9 (also called a socket) stationarily installed on the back surface of the screw pusher plate 3. As the ball screw 8 rotates, the screw pusher plate 3 and all the members attached to the plate 3 as a whole move back and forth with respect to the front plate 1, and the screw 7 fixed to the screw sleeve 4 moves back and forth in the injection cylinder 6.

A load cell 10, which constitutes a pressure detector for detecting an injection holding pressure or a back pressure acting on the screw 7, is disposed at the base of the screw 7, more particularly, between the screw pusher plate 3 and the ball nut 9. The load cell 10 is composed of a load cell body (also called a strain-sensitive member) fixed to the screw pusher plate 3 and ball nut 9 by bolts 13 and 14, respectively, and a strain gauge 12 affixed to the load cell body 11. The load cell body 11 is of a ring shape having a peripheral groove forming a thin-wall portion 11a along the inner circumferential direction as shown in the side sectional view of FIG. 1. The load cell 10 is made to be capable of detecting a force acting between the ball nut 9 and the screw pusher plate 3, that is, a force and a reaction force acting in directions opposite to each other along the direction of the screw shaft between the outer peripheral portion and inner peripheral portion of the load cell body 11. In effect, the thin-wall portion 11a is easily deformed by the effect of the injection holding pressure or the back pressure acting on the screw 7, so that a resin reaction force acting on the screw 7 can be detected.

In order to accurately detect the resin reaction force acting on the screw 7, it is important to raise the repeatable accuracy of pressure detection by the load cell 10. For this reason, a temperature compensation circuit for restraining detection errors due to the effect of ambient temperature, or coating etc. for restraining a detection error due to the effect of humidity are provided to the load cell 10.

However, the installation position of the load cell 10 is close to the cylinder 6, which is a heat source, and the whole of the injection mechanism is placed in a housing of the injection unit together with the metering motor and injection motor, so that the ambient temperature of the load cell 10 during the actual injection molding work is often considerably higher than the ambient temperature at the time of the manufacturing the load cell 10, and the error correction by the temperature compensation circuit alone is sometimes insufficient for accurate measurement.

It is important to provide moisture-proof coating to the load cell 10 to prevent the adverse effect of humidity. However, if air bubbles enter the interior of coating material or the interface with the load cell 10 during the coating, the air bubbles expand or contract by the temperature change, influencing the deformation of the load cell 10 and sometimes giving detrimental effect on the pressure detection accuracy. Needless to say, the effect of internal stress on the load cell caused by the coating the load cell 10 with a material having a different coefficient of thermal expansion cannot be neglected.

Further, if the coating material is subjected to plastic deformation, when a strain due to a load is produced in the load cell 10, the coating material inhibits the elastic return of the load cell 10, sometimes causing the detection pressure of the load cell 10 from returning to zero point even after the load is removed from the load cell 10.

Such a problem is not limited to the coating material. Even an adhesive for fixing the strain gauge 12 to the load cell body 11 has the same problem. The problem with the adhesive is especially serious because the expansion, contraction or plastic deformation and the like of the adhesive directly affect the strain of the strain gauge 12 itself.

In consequence, even if the preventive measures such as the temperature compensation circuit or moisture-proof treatment by coating are taken, it is actually impossible to make a complete compensation for the repeat accuracy of pressure detection by the load cell 10.

When only one set of the load cell 10 is installed on the power transmitting path between the screw 7 and the injection motor, the maximum pressure which must be detected by this load cell 10 is, for example, 2000 kg/cm$^2$, though this pressure depends on the maximum injection holding pressure of the injection molding machine. Even if the aforesaid temperature compensation circuit or moisture-proof treatment is applied, the detection accuracy of the load cell 10 has an error of at least several percent finally, so that even if the error of detection accuracy is assumed to be 1% (actually several percent as described above), the final accuracy error of the load cell 10 will be about 20 kg/cm$^2$ in the above case.

On the other hand, the back pressure in metering is usually set by the unit of 10 kg/cm$^2$ such as 20 kg/cm$^2$, 30 kg/cm$^2$, . . . . Therefore, if an attempt is made to carry out the back pressure control in metering by using the same load cell 10 as that used for the detection of injection holding pressure, the ratio of error becomes too high, so that the proper back pressure control cannot be carried out.

Thereupon, when the temperature of the load cell 10 is too high for the error correction by the temperature compensation circuit, or when the plastic deformation and the like of the coating material affect the elastic deformation of the load cell 10, it is necessary to readjust the zero point of the load cell 10 in accordance with the error produced by the ambient temperature, plastic deformation of coating material, etc. In this case, all disturbance elements other than the error due to temperature change or plastic deformation of coating material must be excluded to make an accurate zero adjustment. In other words, it is necessary to make an adjustment such that the detection pressure of the load cell 10 becomes zero in a state in which only a stress due to temperature change or plastic deformation of coating material acts.

The error caused by the plastic deformation of coating material and the like must also be taken into account even in the case of a pressure detector for an ejector rod or movable platen, which is located relatively far away from the cylinder 6 etc., which is to be less prone to be affected by temperature. In particular, in the case of an injection molding machine having a construction designed so that the volume and pressure in the mold are regulated by moving an ejector pin and other movable members protruding in the mold by the ejector rod, a high detection accuracy is required for the pressure detector of the ejector rod. Also, the detection error of the pressure detector of the movable platen, on which a great mold clamping force acts, caused by the plastic deformation of coating material and other factors, becomes a problem, so that the similar adjustment work is sometimes needed.

A problem involved here is how to remove the effects of all the aforesaid other disturbances on the load cell 10.

The most reliable method in the case of the pressure detector of the screw shaft in the configuration shown in FIG. 1 is to remove the bolts 13, which fix the load cell 10 to the screw pusher plate 3, to retreat the ball nut 9 and the load cell 10 to the right in the figure, or to remove the bolts 13 to advance the screw pusher plate 3 to the left in the figure, thereby enabling the load cell 10 to be separated from other members and allowing the load cell 10 itself to be made completely free.

However, such work requires an extremely complicated procedure. Further, if the ball nut 9, which is separated from the screw pusher plate 3 together with the load cell 10, is inadvertently rotated by hand, a positional shift as to the rotational position detector, such as a pulse coder, installed on the ball screw 8 or the rotor shaft of injection motor for detecting the position of the screw 7 may produce a detrimental effect on the position control of the screw 7.

Therefore, a method is demanded in which the disturbance elements are removed from the load cell 10 without disassembling the injection mechanism.

However, as shown in FIG. 1, frictional forces A1 and A2 such as to hold the screw pusher plate 3 at the current position exist between the tie rod 2 and the screw pusher plate 3. Specifically, there exist a frictional force A1 acting as a reaction force when a retreating force acts on the screw pusher plate 3 and a frictional force A2 acting as a reaction force when an advancing force acts on the screw pusher plate 3.

Also, a frictional force to hold the screw 7 at the current position exists between the screw 7 and the injection cylinder 6. Further, when the resin has been solidified, a resistance to hold the screw 7 at the current position exists between the resin sticking to the inside wall of the injection cylinder 6 and the screw 7. On the other hand, when the resin is melted, there is a case where a resin reaction force to retreat the screw 7 exists between the screw 7 and the resin, and there is another case in which, when the molten resin is solidifying and its volume is decreasing, a force to advance the screw 7 exists between the screw 7 and the resin. In FIG. 1, for convenience, the total resin reaction force to advance the screw 7 is indicated by B1, and the total resin reaction force to retreat the screw 7 by B2.

At a glance, it seems that, when the rotation of the ball screw 8 is made free by cutting off the drive of the injection motor for driving the ball screw 8, the ball nut 9 moves back and forth freely in response to a force such as the tension (B1-A2) acting on the load cell 10 or the stress (B2-A1), and further that the ball screw 8 side rotates freely in response to the longitudinal movement of the ball nut 9 to remove the tension (B1-A2), the stress (B2-A1), etc., thereby completely removing the disturbance elements acting on the load cell 10.

Actually, however, even if the drive of the injection motor is cut off, there is still some degree of friction between the ball screw 8 and the ball nut 9, and this friction acts in a direction such that the free rotation of the ball screw 8 is hindered, so that a force to keep the current position of the ball nut 9 on the ball screw 8 acts. Therefore, the ball nut 9 cannot be moved back and forth freely in response to the tension or stress acting on the load cell 10, so that the disturbance elements cannot be removed completely from the load cell 10. Needless to say, the frictional resistance, etc. at the rotor portion of the injection motor also present a problem.

Also, a zero adjusting method, in which a predetermined thrust force is given to the screw 7 to detect the reaction force by the load cell 10, and zero adjustment is made so that the given thrust force and the value detected by the load cell 10 agree with each other, has been disclosed in Unexamined Japanese Patent Publication No. 7-205229, and this method has produced satisfactory results in improving the detection accuracy of the injection holding pressure and the back pressure in metering. In this configuration, however, the load cell 10 picks up disturbance etc. due to the frictional resistance acting on various components of the driving system in addition to the thrust force given to the screw 7, so that the detected value including the disturbance is finally adjusted, and thus the zero adjustment of the load cell 10 alone cannot be made.

As described above, in making the zero adjustment of the load cell 10, it is too time-consuming to remove the disturbance elements by separating the load cell 10 from other members by disassembling the injection mechanism. Furthermore, merely de-energizing the injection motor for driving the ball screw 8 is not good enough to completely remove the disturbance elements of load acting on the load cell 10. When the zero adjustment of the load cell 10 is made including the disturbance elements, it is sometimes difficult to check the abnormality of the load cell 10 itself.

DISCLOSURE OF THE INVENTION

An object of the present invention is to provide a zero adjusting method and apparatus for a pressure detector on an injection molding machine, in which the zero adjustment of the pressure detector can be made properly in a state in which external loads acting on the pressure detector are removed completely without the need of disassembling an injection mechanism.

In the present invention, a movable member of the injection molding machine is driven to start reciprocating motion, in which the amplitude decreases gradually, at an arbitrary position, and the reciprocating motion is stopped when the amplitude becomes a value not higher than a preset value. The output of the pressure detector at the time when the reciprocating motion is stopped is read, and the output of the pressure detector is corrected based on the read value.

More particularly, a drive source for driving the movable member is driven in both normal and reverse directions for causing the movable member to make the reciprocating motion until the amplitude of the movable member becomes a value not higher than the preset value so that the centers of the normal and reverse drive of the drive source coincide with the center of the reciprocating motion of the movable member. By doing so, a backlash in the normal and reverse directions is produced between the movable member and the drive source, the movable member is substantially separated from a power transmitting path, and the zero adjustment of the pressure detector is made in a state in which external loads acting on the movable member are removed completely.

In starting the reciprocating motion, therefore, it is more effective to make coincide the center of reciprocating motion with the center of backlash in advance. This is because the range itself of the reciprocating motion of the movable member is sometimes limited for some reason like the case of a screw shaft etc. whose movement is limited by solidified resin.

Thus, in order to serve this purpose, the output of a drive source for driving the movable member is made low, and a command for moving the movable member by a preset amount is issued to the drive source with reference to the current position of the movable member. Then, the stop position of the movable member is detected and the stop position is stored as a first stop position.

Further, a command for moving the movable member in the reverse direction by the preset amount is issued to the drive source with reference to the current position of the movable member. Then, the stop position of the movable member is detected and stored as a second stop position. And, the reciprocating motion is performed with respect to one intermediate point between the first and second stop positions being the center of the movement.

In a situation in which the movement itself of the movable member is completely fixed, it is meaningless to reciprocate the movable member itself. Therefore, the reciprocating motion is performed by taking, as an initial value of amplitude, a value which is not higher than ½ of the distance between the first and second stop positions and not lower than ½ of the amount of backlash produced between the movable member and drive source.

On the other hand, when the zero adjustment of the pressure detector for screw shaft has to be made with the melted resin remaining in a cylinder, or when the zero adjustment of the pressure detector provided for the movable member having an adherent sliding resistance to a guide rod etc., has to be made, not only the connecting portion of the movable member and the power transmitting path but also the pressure, viscosity, etc. of resin acting on the movable member can affect the pressure detector depending on the situation. Therefore, by allowing the reciprocating motion to be performed by taking, as an initial value of amplitude, a value which is obtained by adding a preset value to a value of ½ of the distance between the first and second stop positions, or a value, which is obtained by multiplying a value of ½ of the distance between the first and second stop positions by a number higher than 1, thereby enabling the movable member to move positively at the initial stage of reciprocating motion so that the resin, the oil etc. at the sliding portion is made to move more easily and work more effectively for the movable member, by which the external forces due to the pressure and viscosity of resin and the viscosity etc. of oil at the sliding portion are removed from the movable members.

Designed so that a backlash in the normal and reverse directions is produced between the movable member and drive source to substantially separate the movable member from the power transmitting path and remove the external loads acting on the movable member, it is desirable finally to continue the reciprocating motion until the amplitude of drive source becomes smaller than ½ of the amount of overall backlash occurring between the movable member and the drive source, that is, until the connection between the movable member and the power transmitting path is severed.

The drive source for driving the movable member can be composed of a servomotor having output limiting means.

In the case of the pressure detector for detecting the pressure acting on the screw shaft, both the automatic purging operation and the zero adjustment of the aforesaid pressure detector can be carried out automatically, so that the zero adjustment of the pressure detector can be made without fail at proper time intervals such as those for the change of material for molding.

Also, an abnormality detection signal is generated when the absolute value of correction amount of the output of pressure detector exceeds a predetermined amount, thereby enabling serious abnormality, which cannot be corrected by zero adjustment only, to be detected.

Further, the history of zero adjustment including the date and correction amount of adjustment is stored in a control unit of the injection molding machine and the stored history is displayed, whereby the deterioration in performance or the presence of serious abnormality of the pressure detector can be found more easily.

BRIEF DESCRIPTION OF THE DRAWINGS

FIG. 8 is a diagram conceptually showing a file for storing the adjustment history.

BEST MODE OF CARRYING OUT THE INVENTION

Figure 1:
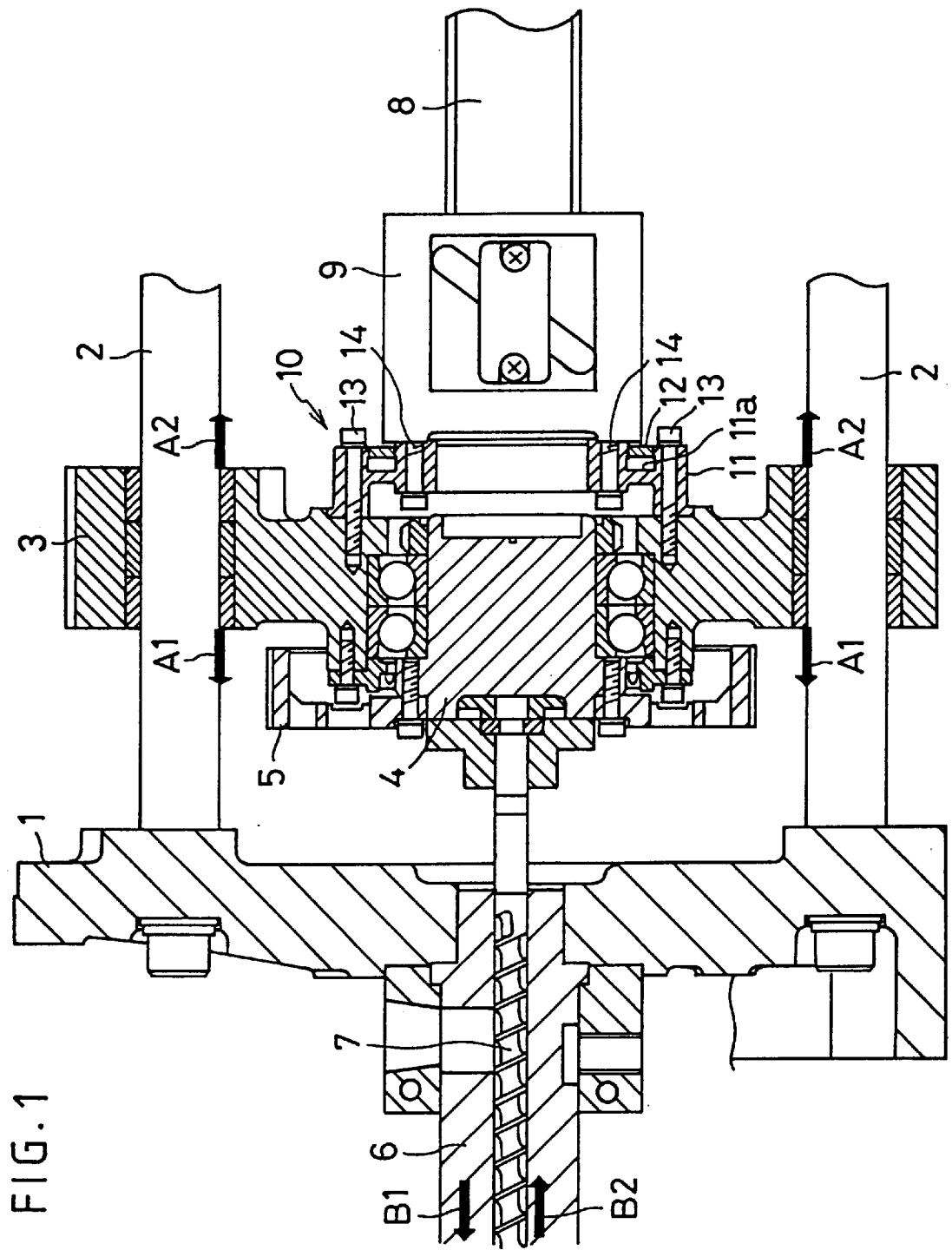
FIG. 1 is a sectional view of a principal portion of a pressure detector having a typical construction using a load cell.

The principle of the present invention will be described with reference to FIG. 1, for a pressure detector for detecting a pressure acting on a screw as an example.

First, a command for moving a screw 7 by a preset amount with reference to the present screw position is issued to a drive source so that the screw 7 is moved back and forth with a small force (low output) until the movable limit position is reached.

In such a condition, if the resin in an injection cylinder 6 is melted, even in a small amount, and in a state such that it can be compressed in either direction, the drive source can operate exceeding at least the backlash amount, so that the screw 7 can be moved back and forth to some extent within the range of the aforesaid preset amount.

More strictly speaking, when the resin in the injection cylinder 6 is melted to a degree at which its viscosity has become considerably low as compared to the viscosity at room temperature, the screw 7 can advance or retreat by the aforesaid preset amount from the initial screw position being the reference. If the melting of resin is insufficient, and thus the viscosity thereof remains considerably high, it is impossible for the drive source to move the screw 7 by the aforesaid preset amount with the aforesaid small force. Therefore, the screw 7 advances or retreats by an amount less than the aforesaid preset amount from the initial screw position being the reference.

When the viscosity of the resin is low, that is, when the screw 7 can move by the aforesaid preset amount, a resin reaction force will not cause a big problem as a disturbance element. The resin reaction force will become a problem as a disturbance element in such a case where the viscosity of resin is high, and a resin reaction force (B2) to retreat the screw 7 acts between the screw 7 and the resin in a state in which the screw 7 stops at the initial screw position, for example, in a case where the screw 7 is stopped at the initial screw position in a state in which a positive compressive force is left in the resin by discontinuing the advancing motion of the screw 7, and in such a case where a resin reaction force (B1) to advance the screw 7 acts between the screw 7 and the resin in a state in which the screw 7 stops at the initial screw position, for example, in a case where the screw 7 is stopped at the initial screw position in a state in which a negative compressive force is left in the resin by discontinuing the retreating motion of the screw 7, and in the like cases.

As an example, consideration is given to the case where the resin reaction force (B2) to retreat the screw 7 acts between the screw 7 and the resin in a state in which the screw 7 stops at the initial screw position.

As described above, if the screw 7 is advanced with a small force from the initial screw position being the reference, when the resin reaction force (B2) to retreat the screw 7, which increases in proportion to the cubic compression of resin due to the advance of the screw 7 balances with the aforesaid small force of the drive source to advance the screw 7, the advance of the screw 7 stops. This position is stored as the first stop position.

If the screw 7 is retreated with a small force from the initial screw position being the reference, when the resin reaction force (B1) to advance the screw 7, which increases in proportion to the volume expansion of resin due to the retreat of the screw 7, balances with the aforesaid small force of the drive source to retreat the screw 7, the retreat of the screw 7 stops. This position is stored as the second stop position.

The position of the screw 7, at which the resin reaction force (B1, B2) acting on the screw 7 becomes substantially zero, is the middle point between the limit position, to which the screw 7 advances when the screw 7 is advanced with a predetermined force, and the limit position, to which the screw 7 retreats when the screw 7 is inversely pulled with the same force as the aforesaid predetermined force, that is, the intermediate position between the first and second stop positions. Thereupon, this intermediate position is first determined, and the screw 7 is moved to this position, by which the effect of the resin reaction force on the screw 7 is removed.

In consequence, when the resin reaction force (B2) to retreat the screw 7 acts between the screw 7 and the resin in a state in which the screw 7 stops at the initial screw position, the aforesaid intermediate position shifts backward to the rear with respect to the initial screw position. When the resin reaction force (B1) to advance the screw 7 acts between the screw 7 and the resin in a state in which the screw 7 stops at the initial screw position, the aforesaid intermediate position shifts forward with respect to the initial screw position.

When the viscosity of resin is low, that is, when the screw 7 can be moved freely by the aforesaid preset amount, the advance limit position of the screw 7 shifts forward by the aforesaid preset amount with respect to the initial screw position, and the retreat limit position of the screw 7 shifts backward by the aforesaid preset amount with respect to the initial screw position. In consequence, the calculated intermediate position agrees with the initial screw position. As already described, in such a case, the resin reaction force will not become a big problem as a disturbance element.

However, in order to decrease the effect of the resin reaction force, as described later specifically, the screw is reciprocated (or vibrated) with respect to one point of the intermediate portion being the center, by which a force exerted from the resin on the screw at the intermediate position is made to be eliminated.

If the screw is reciprocated until the reciprocating stroke of the drive source for driving the screw becomes smaller than the backlash, the screw stops to move further, and only the drive source reciprocates. If the screw is stopped at this stage, the screw will not have any force acting thereon from either the resin or the drive source, so that no pressure is applied to the pressure detector.

On the other hand, if the resin in the injection cylinder 6 is not melted at all, and the screw 7 is completely at rest with respect to the injection cylinder 6, the drive source cannot be operated for the movement exceeding the backlash amount, and naturally the screw 7 will not move.

Thus, the first stop position in this case is a position of the drive source at which the drive source operates in the direction for advancing the screw 7 and for eliminating a backlash between the screw 7 and the drive source, thereby allowing the driving force of the drive source to be transmitted directly to the screw 7 as an advance force, while the second stop position is a position of the drive source at which the drive source operates in the direction for retreating the screw 7 and for eliminating the backlash between the screw 7 and the drive source so that the driving force of the drive source is transmitted directly to the screw 7 as a retreating force.

Thus, when the resin in the injection cylinder 6 is not melted at all, and the screw 7 is completely at rest with respect to the injection cylinder 6, the drive source is moved to the intermediate position of backlash, that is, the position at which neither the driving force of the drive source is transmitted directly to the screw 7 as an advancing force nor the driving force of the drive source is transmitted directly to the screw 7 as a retreating force, by a command for the movement to the intermediate position. At a glance, it seems that, under such a condition, the connection between the screw 7 and the drive source is completely cut off, and the external forces acting on the pressure detector 10 are removed completely.

When the power transmitting path from the drive source to the screw 7 is complex, however, a backlash is produced with each of the components of the power transmitting path. Even if the drive source is moved to the intermediate position of the overall backlash between the screw 7 and the drive source, all the backlashes of the components are not always shifted to the respective intermediate positions.

That is, just like the above-described case where the screw 7 is moved from the second stop position, which is the retreat limit position, to the intermediate position in a state in which the resin is melted to some extent, there is a possibility that the pressure detector 10 between a screw pusher plate 3 and the ball nut 9 is under the influence of some external force acting thereon.

For example, in the example shown in FIG. 1, if the magnitude of backlash between the ball nut 9 and the ball screw 8, the magnitude of backlash between the ball screw 8 and a timing belt for driving the ball screw 8, and the magnitude of backlash between the timing belt and an injection motor for driving the timing belt are taken as C, respectively, the amount of backlash of the whole power transmitting path from the drive source to the pressure detector 10 is 3C.

Then, consideration is given to the case where the position at which the backlash in the advancing direction of the screw 7 is eliminated, that is, the position at which the driving force of the injection motor is transmitted directly to the screw 7 as an advancing force is called a first stop position, and the position at which the backlash in the retreating direction of the screw 7 is eliminated, that is, the position at which the driving force of the injection motor is transmitted directly to the screw 7 as a retreating force is called a second stop position; the movement is made from the first stop position to the second stop position. The injection motor is rotated by $(3/2) \cdot C$ from the second stop position. The injection motor is them moved to the middle point between the first stop position and the second stop position, that is, the intermediate position of the overall backlash.

In other words, this is a movement from the second position, at which the backlash in the retreating direction of the screw 7 is absent, and the backlash in the advancing direction of the screw 7 is at a maximum, to the intermediate position.

Naturally, the order in which the backlash in the advancing direction of the screw 7 is eliminated by the rotation of the injection motor in this case, when a set of components of each part is viewed as a unit, the first is the backlash between the timing belt for driving the ball screw 8 and the injection motor, the next is the backlash between the ball screw 8 and the timing belt, and the last is the backlash between the ball nut 9 and the ball screw 8.

At this time, since the travel amount $(3/2) \cdot C$ of the injection motor is larger than the backlash C between the timing belt for driving the ball screw 8 and the injection motor, the backlash in the advancing direction of the screw 7 between the timing belt and the injection motor is eliminated completely when the injection motor moves by C. As a result, the timing belt is moved in the advance direction of the screw 7 by $[(3/2) \cdot C - C = (1/2) \cdot C]$, and at the same time, the injection motor completes the commanded travel of $(3/2) \cdot C$ and stops.

However, since the rotation amount $(3/2) \cdot C$ of the timing belt is less than the backlash amount C between the ball screw 8 and the timing belt, the backlash in the advance direction of the screw 7 between the ball screw 8 and the timing belt is not eliminated completely, so that the ball 8 itself does not rotate at all.

Thereupon, the relationship between the ball nut 9 and the ball screw 8 is held in a state in which the injection motor is rotated from the first stop position toward the second stop position, that is, a state in which the backlash in the retreat direction of the screw 7 is eliminated completely, by which the ball nut 9 is pulled by the ball screw 8. Therefore, the tension acting on the pressure detector 10 cannot be removed.

This means that even if the injection motor is rotated in the reverse direction from the first stop position toward the second stop position, and then rotated in the normal direction by ½ of the overall backlash amount to be moved to the middle point between the first and second stop positions, the tension between the ball screw 8 and the ball nut 9 cannot always be removed.

As far as the above-described example in which the magnitude of backlash between the ball nut 9 and the ball screw 8, the magnitude of backlash between the ball screw 8 and the timing belt, and the magnitude of backlash between the timing belt and the injection motor are taken as C, respectively is concerned, when the magnitude C of backlash between the ball screw 8 and the timing belt is added to the magnitude C of backlash between the timing belt and the injection motor, and the sum is further added to the half of magnitude (½)·C of backlash between the ball nut 9 and the ball screw 8 to obtain a value of $(5/2) \cdot C$, and the injection motor is rotated in the normal direction by this $(5/2) \cdot C$ to be moved from the second stop position toward the first stop position, the stress or tension directly affecting the pressure detector 10 can be removed.

Actually, however, since the backlash amount of each part of the power transmitting path varies depending on the degree of wear of the machine, etc., the travel amount of the drive source to move the backlash between the ball nut 9 and the ball screw 8 to the neutral position cannot be determined on a single basis such as a predetermined value etc. Therefore, it is necessary to perform a processing based on a certain algorithm designed for moving the backlash between the ball nut 9 and the ball screw 8 to the neutral position.

The precedence of advance or retreat of the screw 7 may be determined arbitrary. Inverse to the above description, when the retreat operation of the screw 7 is performed first, the retreat stop position is stored as the first stop position, and the advance stop position is stored as the second stop position, but the calculation result regarding the intermediate position is the same.

In order to fulfill the task of the present invention, with one point of the intermediate portion serving as a center, a value which is not higher than ½ of the distance between the first and second stop positions and not smaller than ½ of the total amount of backlash produced between the screw and the drive source is taken as the initial value of amplitude, and the drive source is reciprocated at least until the amplitude becomes smaller than ½ of the backlash amount. The phenomenon produced by this algorithm will be explained below based on the typical configuration shown in FIG. 1.

First, the magnitude of amplitude at the initial stage of started reciprocation is ½ of the distance between the first and second stop positions, that is, ½ of the magnitude of the overall backlash, which is equal to or higher than (3·C)/2, for example. This value is larger than the sum of the magnitude of backlash between the ball nut 9 and the ball screw 8, the magnitude of backlash between the ball screw 8 and the timing belt, and the magnitude of backlash between the timing belt and the injection motor. Therefore, the ball screw 8 rotates repeatedly in the normal and reverse directions, exceeding an interval between a position, at which the backlash in the advance direction of the screw 7 between the ball nut 9 and the ball screw 8 is eliminated and the normal rotation of the ball screw 8 is directly transmitted to the ball nut 9 as the advance force of the screw 7, and a position, at which the backlash in the retreat direction of the screw 7 between the ball nut 9 and the ball screw 8 is eliminated and the normal rotation of the ball screw 8 is directly transmitted to the ball nut 9 as the retreat force of the screw 7.

When the magnitude of amplitude decreases gradually to a magnitude smaller than ½ of the overall backlash amount, for example, (3·C)/2, the ball screw becomes unable to rotate to the position at which the normal rotation of the ball screw 8 is directly transmitted to the ball nut 9 as the advance force of the screw 7 or to the position at which the reverse rotation of the ball screw 8 is directly transmitted to the ball nut 9 as the retreat force of the screw 7, so that the substantial contact between the ball screw 8 and the ball nut 9 is cut off.

In this state, since the ball screw 8 is completely separated from the ball nut 9, that is, they are not in contact with each other, neither a force of the ball nut 9 to push the pressure detector 10 nor a force of the ball nut 9 to pull the pressure detector 10 will act, so that the disturbance to act on the pressure detector 10 substantially becomes zero.

Needless to say, even in such a state, if there is a possibility that a resin pressure etc. acts on the screw 7 to produce a force to push or pull the screw pusher plate 3, causing the screw pusher plate 3 itself to be moved, this possibility cannot be neglected. However, as described above, in the present invention, the resin reaction force itself acting on the screw 7 has been removed in advance by the movement of the drive source from the second stop position to the intermediate position, so that there is no problem in this respect.

Thereupon, as shown in FIG. 1, if the pressure detector 10 is disposed at a final position on the power transmitting path, for example, at a position between the ball nut 9 and the screw pusher plate 3, when the magnitude of amplitude becomes smaller than ½ of the overall backlash amount, (3·C)/2, the reciprocating motion can be stopped immediately to make the zero adjustment of the pressure detector 10. Naturally, the external loads acting on the pressure detector 10 in this state are zero.

If the reciprocating motion is to be continued without stopping even when the magnitude of amplitude becomes smaller than ½ of the overall backlash amount, (3·C)/2, in the above example, the normal and reverse rotation of the ball screw 8 stops completely when the amplitude decreases to C, that is, when the amplitude becomes smaller than the sum of the magnitude of backlash between the ball screw 8 and the timing belt and the magnitude of backlash between the timing belt and the injection motor. This is because the reciprocating motion of the drive source is absorbed completely by the backlash between the ball screw 8 and the timing belt and the backlash between the timing belt and the injection motor, causing the driving force of the drive source is not to be transmitted to the ball screw 8. The position at which the normal and reverse rotation of the ball screw 8 stops is naturally the center of the reciprocating motion of the ball screw 8, which lies at an intermediate point between the position at which the normal rotation of the ball screw 8 is directly transmitted to the ball nut 9 as the advance force of the screw 7 and the position at which the reverse rotation of the ball screw 8 is directly transmitted to the ball nut 9 as the retreat force of the screw 7.

If the reciprocating motion is to be continued further under the same condition, in the above example, the normal and reverse rotation of the timing belt stops completely when the amplitude has decreased to C/2, that is, when the amplitude has become smaller than the magnitude of backlash between the timing belt and the injection motor. This is because the reciprocating motion is absorbed completely by the backlash between the timing belt and the injection motor, causing the driving force of the drive source not to be transmitted to the timing belt. The position at which the normal and reverse rotation of the timing belt stop is naturally the center of the reciprocating motion of the timing belt, which lies at an intermediate point between a position at which the normal rotation of the timing belt is directly transmitted to the ball nut 8 as a normal rotational force of the ball nut 8 and a position at which the reverse rotation of the timing belt is directly transmitted to the ball nut 8 as the reverse rotational force of the ball nut 8.

Finally, the position of injection motor at which the amplitude of injection motor decreases to zero to come to rest is the center of the reciprocating motion of the injection motor itself, which lies at an intermediate point between a position at which the normal rotation of the injection motor is directly transmitted to the timing belt as the normal rotational force of the timing belt and a position at which the reverse rotation of the injection motor is directly transmitted to the timing belt as the reverse rotational force of the timing belt.

That is, according to the present invention, by carrying out the reciprocating motion until the magnitude of amplitude finally converges to zero or to a value approximate to zero, all the backlashes of the components can be shifted to the neutral position of each backlash.

In the above-described example shown in FIG. 1, it cannot be thought by any means that the pressure detector 10 is installed at a position other than that between the ball nut 9 and the screw pusher plate 3, for example, at a position between the ball screw 8 and the timing belt for driving the ball screw 8 or between the timing belt and the injection motor for driving the timing belt. In an injection mechanism configured by a power transmitting path consisting of components different from those in the above-described example, however, the pressure detector 10 sometimes can be disposed at a position on the power transmitting path different from the position between the ball nut 9 and the screw pusher plate 3 in the example shown in FIG. 1.

According to the present invention utilizing reciprocating motion, each of all the backlashes of the components can be shifted finally to the neutral position of each backlash regardless of the configuration of power transmitting path. Thus, regardless of the position of installation of the pressure detector 10, a substantial connection between a component, which gives a direct load to the pressure detector 10, and the pressure detector 10 can be cut off, whereby the disturbance to the pressure detector 10 can be removed.

When the resin in the injection cylinder 6 is melted, the initial value of the amplitude is larger than the sum of ½'s of backlash amount of mechanical system. In this case, however, the movement itself of the screw 7 is allowed, so that there is no problem. In such a case, the movement itself of the screw 7 can be thought as a part of the overall backlash, and the screw 7 itself stops at the center of the reciprocating motion, that is, the aforesaid intermediate position, like the cases of aforesaid components.

The final zero adjustment is made by reading the present value of the pressure detector, that is, the output of the pressure detector in the no-load condition after the completion of reciprocating motion, and by adjusting the output of the pressure detector so that the present value becomes zero.

Also, as a means for moving the screw 7 in a state in which the output of the drive source for driving the screw 7 is low, a servomotor having output limiting means can be used.

Further, by applying a value obtained by adding a preset value to ½ of the distance between the first and second stop positions, or a value obtained by multiplying ½ of the distance between the first and second stop positions by a number larger than 1 as the initial value of the amplitude, even if the backlash is increased by the wear of the machine, proper measures can be taken against such a situation.

Basically the same procedure as that described above can be applied to the case of pressure detector for an ejector rod or a movable platen too.

Figure 2:
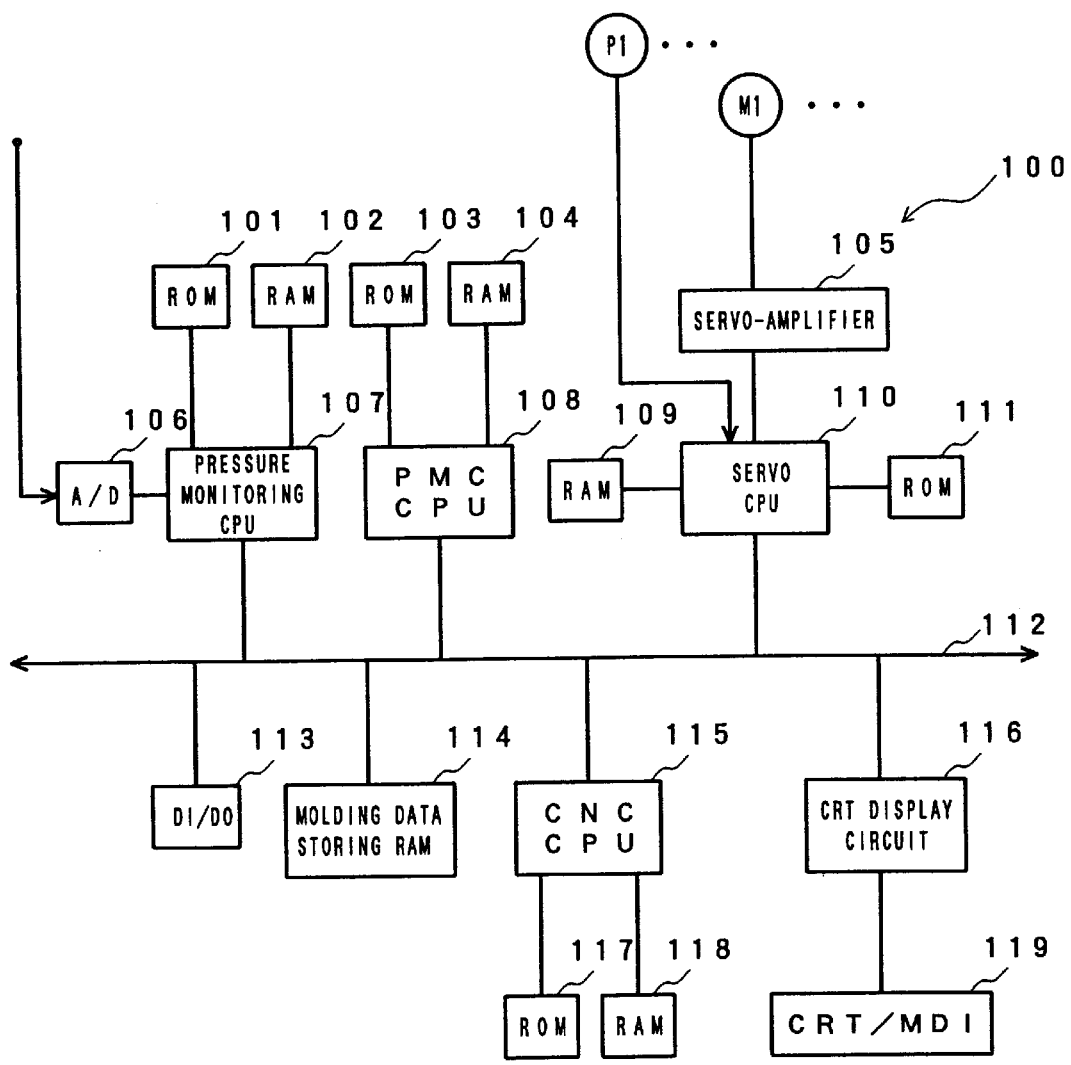
FIG. 2 is a block diagram showing a principal portion of a controller for driving and controlling the various parts of an injection molding machine.

FIG. 2 is a block diagram showing a principal portion of a numerical control unit 100 used as a controller for controlling the drive of parts of the injection molding machine.

The numerical control unit 100, having a CPU 115 for CNC, which is a microprocessor for numerical control, a CPU 108 for PMC, which is a microprocessor for programmable machine controller, a servo CPU 110, which is a microprocessor for servo control, and a CPU 107 for pressure monitor, which performs sampling by detecting the injection holding pressure and the back pressure during metering from the load cell 10 on the injection molding machine side via an A/D converter 106, can transmit information between the microprocessors via a bus 112 by selecting input and output.

Connected to the CPU 108 for PMC are a ROM 103, which stores a sequence program for controlling the sequence operation of the injection molding machine and other programs, and a RAM 104, which is used for temporary storage of arithmetic data and for other purposes. Connected to the CPU 115 for CNC are a ROM 117, which stores a control program for controlling the drive of each axis of the injection molding machine and other programs, and a RAM 118, which is used for temporary storage of arithmetic data and for other purposes.

Also, connected to the servo CPU 110 are a ROM 111, which stores a control program dedicated for servo control, and a RAM 109, which is used for temporary storage of data. Connected to the CPU 107 for monitoring pressure are a ROM 101, which stores a control program regarding the sampling of injection holding pressure and back pressure and other processing, and a RAM 102, which is used for temporary storage of data. The RAM 102, which is a nonvolatile memory, has a storage region for storing the correction value of the load cell 10. The CPU 107 for monitoring pressure detects a value which is obtained by adding a correction value to the output of the A/D converter 106 as an injection holding pressure and back pressure. However, when the later-described zero adjustment is made, the aforesaid addition is canceled, and the output of the A/D converter 106 is read directly.

A servo-amplifier 105, which drives servomotors of axes for mold clamping, ejector, injection, screw rotation, etc. based on the command from the CPU 110, is connected to the servo CPU 110 so that the output of a pulse coder attached to the servomotor of each axis is fed back to the servo CPU 110. The current position of each axis is calculated by the servo CPU 110 based on the feedback pulse from the pulse coder, and is updated and stored in a current position storage register of each axis.

FIG. 2 shows only a servomotor M1 for injection, which drives the servo-amplifier 105 for one axis and the ball screw 8 of the injection mechanism, and a corresponding pulse coder P1. The configuration of each axis for mold clamping, ejector, sprue break, etc. is the same as the above configuration. However, the configuration for screw rotation need not detect the current position, and only has to detect the speed.

An interface 113 is an input/output interface for receiving signals from limit switches installed on various components of the injection molding machine body and a control panel and for transmitting various commands to peripheral equipment of the injection molding machine.

A manual data input device 119 with display is connected to the bus 112 via a CRT display circuit 116 so that the graphic display and function menu on the screen can be selected, and the input operation of various data, etc. can be performed. Further, this device is provided with ten keys for inputting numerical data, various function keys, etc.

A nonvolatile memory 114 preserves molding data such as the molding conditions for injection molding work and various setting values, parameters, macro variables, etc.

By the above-described configuration, the CPU 108 for PMC controls the sequential operation of the whole injection molding machine, the CPU 115 for CNC distributes pulses to the servomotors of axes based on the operation program for each axis in ROM 117, the molding conditions in the nonvolatile memory 114, etc.; and the servo CPU 110 carries out servo control such as position loop control, speed loop control, and current loop control based on a movement command distributed by pulse to each axis and a feedback signal of the position and speed detected by a detector such as the pulse coder, as in the conventional case. Thus, so-called digital servo processing is executed for injection molding work.

FIGS. 4 to 7 are flowcharts schematically illustrating zero adjustment processing for automatically making zero adjustment of the load cell 10. The program for this zero adjustment processing is executed by the CPU 115 for CNC by selecting "zero adjustment of load cell" from the function menu.

The CPU 115 for CNC, which has started the zero adjustment processing first reads the current position B of the motor for sprue break (Step S1), and determines whether or not the injection unit has retreated to a preset retreat position for purging (Step S2). If the injection unit has not retreated to the preset retreat position, a retreat command is issued to the motor for sprue break (Step S3) to make the injection unit retreat to the preset retreat position for purging (Step S4), and stop at the preset retreat position (Step S5).

This process is designed to prevent molten resin from being discharged and sticking to the mold and stationary platen when the screw 7 is advanced. Therefore, when the injection unit has already retreated to the preset retreat position for purging as in the case where automatic purging has been executed, that is, when the result of determination in Step S2 is Yes, naturally this processing will not be executed.

Next, the CPU 115 for CNC initially sets zero, the value indicating melting, in a flag F which stores the solidified state of resin (Step S6), and reads and stores the current position Ps of the servomotor M1 for injection, that is, the current position of the screw 7 (Step S7). This value Ps is the aforesaid initial current position of the screw. However, as described previously, since there is some backlash between the servomotor M1 for injection and the screw 7, sometimes an error occurs, within the range corresponding to the backlash, between the current screw position corresponding to the position of the servomotor M1 for injection and the actual current screw position.

For example, in the case where the screw 7 is stopped at the initial current position of screw in a state such that a positive compressive force is left in the resin by interrupting the advancing or the screw 7, the actual current screw position is sometimes slightly behind the current screw position corresponding to the position of the servomotor M1 for injection. On the other hand, in the case where the screw 7 is stopped at the initial current position of screw in a state such that a negative compressive force is left in the resin by interrupting the retreating of the screw 7, the actual current screw position is sometimes slightly ahead of the current screw position corresponding to the position of the servomotor M1 for injection.

Figure 3:
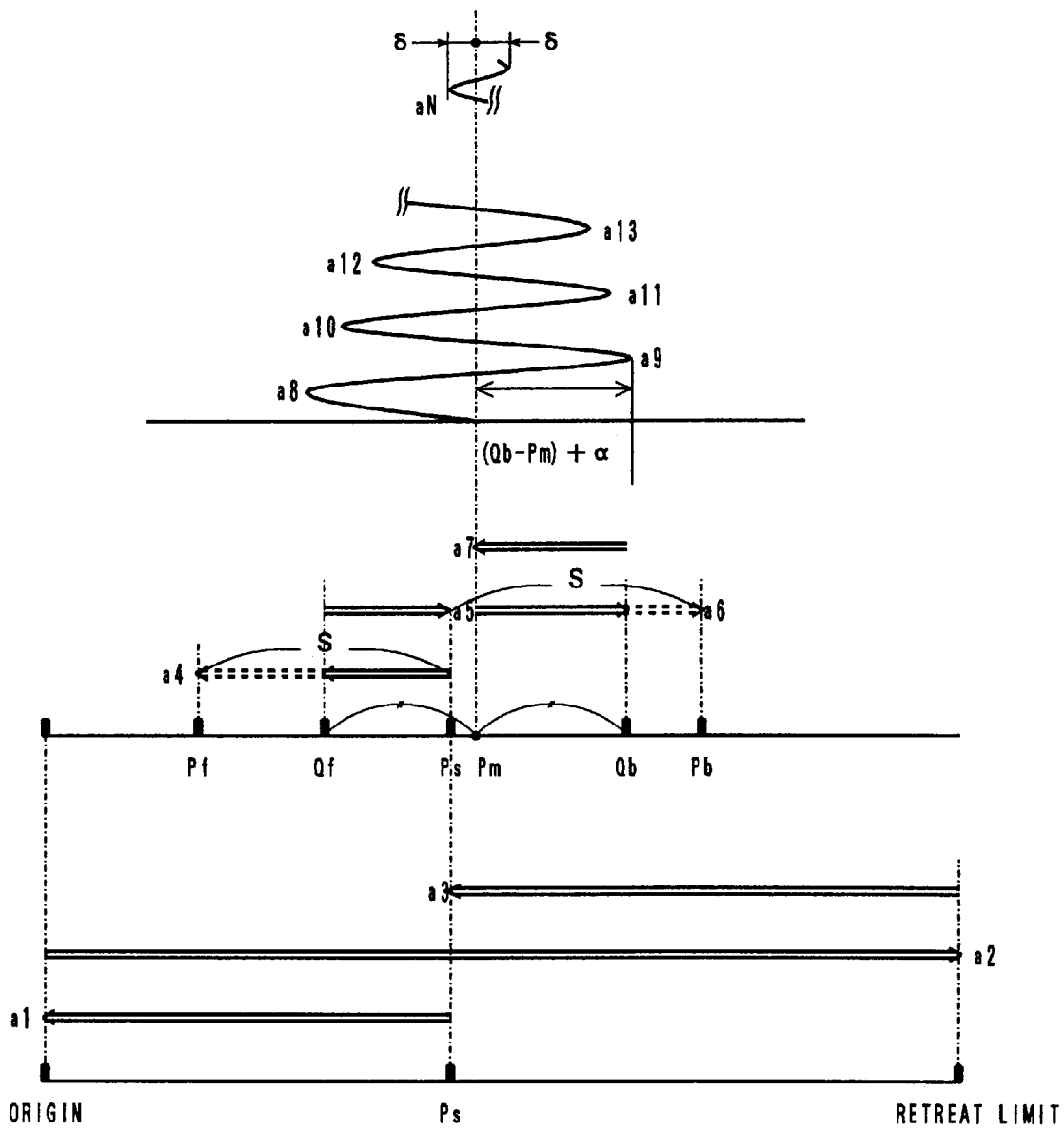
FIG. 3 is a schematic diagram showing screw positions in accordance with the procedure of zero adjustment, with the tip end of an injection cylinder being an origin.
Figure 4:
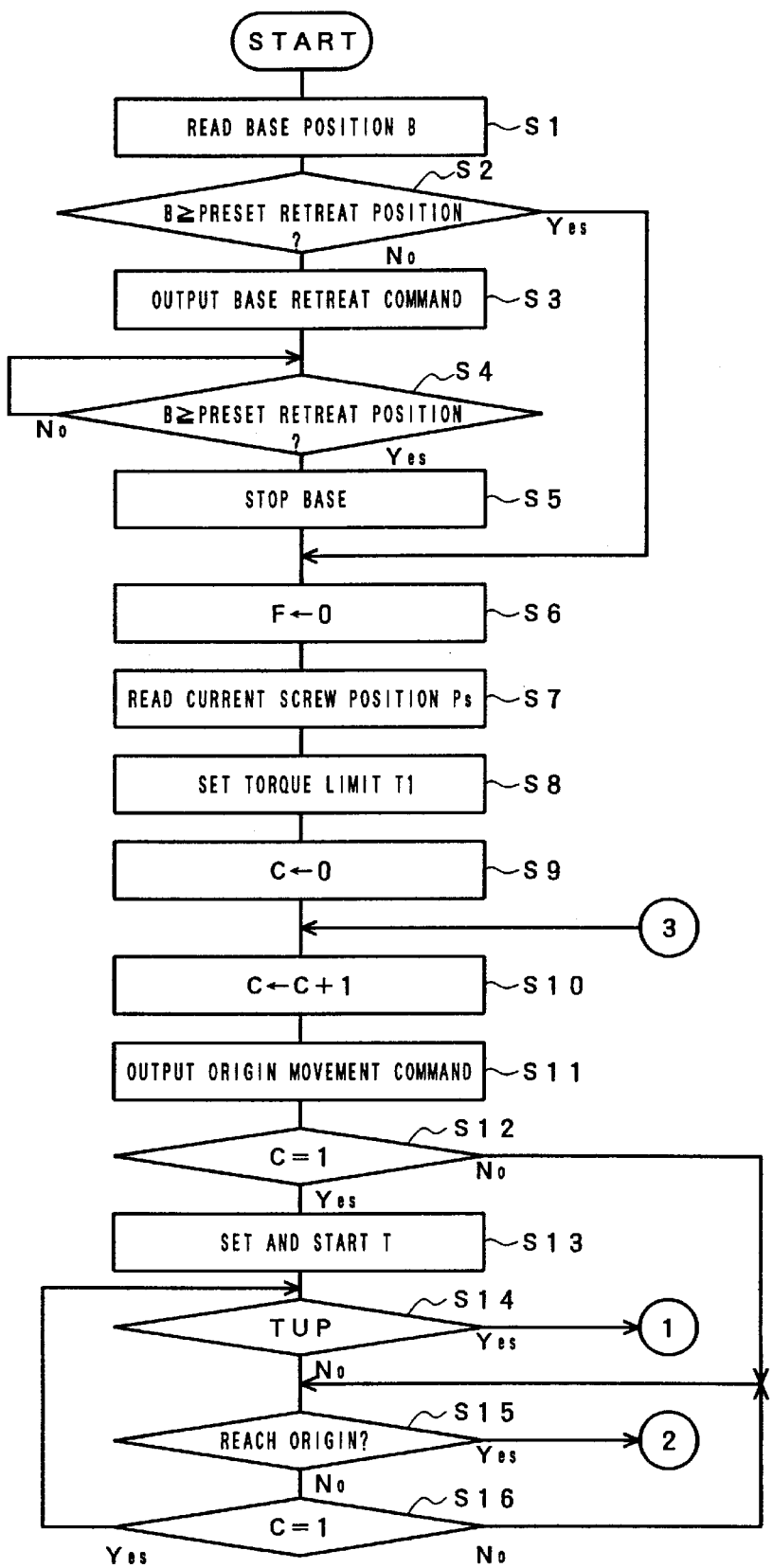
FIG. 4 is a flowchart showing zero adjustment procedure for automatic zero adjustment.
Figure 5:
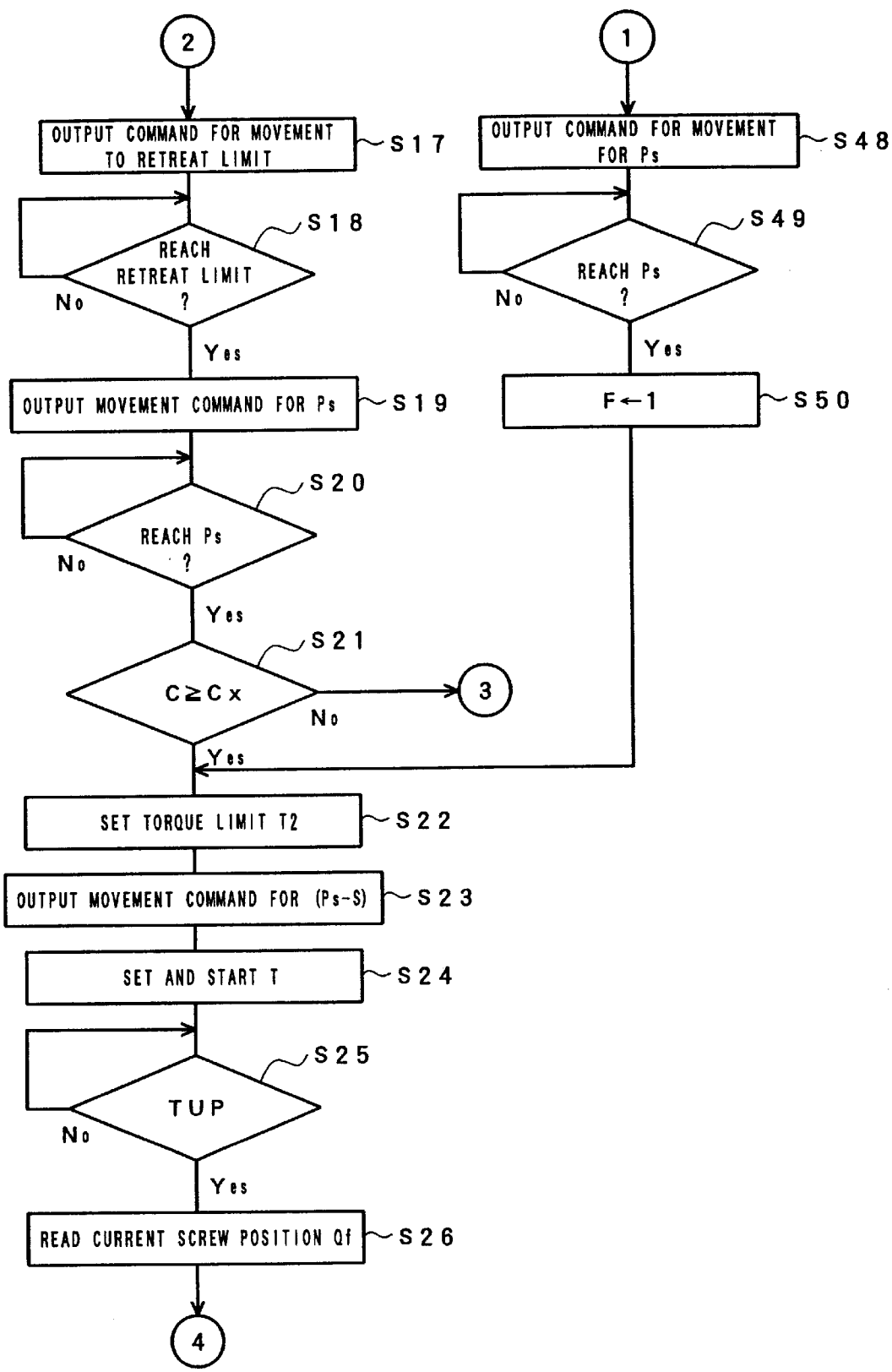
FIG. 5 is a continued flowchart showing the zero adjustment procedure.
Figure 6:
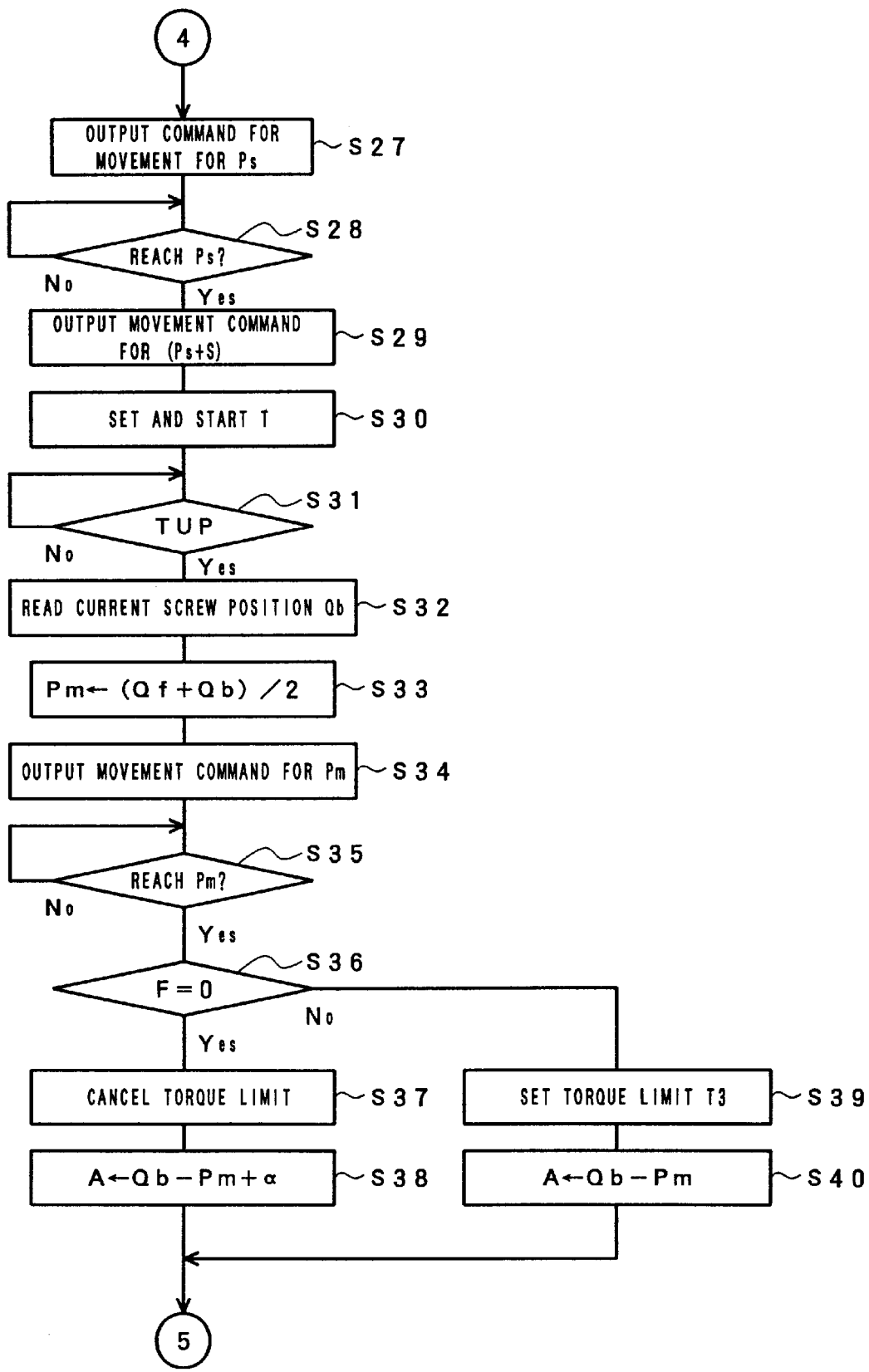
FIG. 6 is a continued flowchart showing the zero adjustment procedure.

One example of the initial current position Ps of screw is shown on the numeric straight line in FIG. 3, which shows the position of screw 7 with the front end of the injection cylinder 6 being the origin.

Then, the CPU 115 for CNC, which has stored the initial current position Ps of the servomotor M1 for injection sets a torque limit T1 in the servo CPU 110 to limit the driving force of the servomotor M1 for injection to a low output (Step S8), initially sets zero in a counter C for counting the number of reciprocating motions of the screw 7 (Step S9), increases the value of the counter C by one increment (Step S10), and outputs a movement command, which is necessary to move the screw 7 from the initial current position Ps of the screw to the front end of the injection cylinder 6 (hereinafter referred to as the origin), to the servomotor M1 for injection (Step S11, movement to a1 shown in FIG. 3).

Next, the CPU 115 for CNC determines whether or not the value of the counter C is 1, that is, whether or not the command for movement to origin of this time is the command for the movement to origin in the first reciprocating motion (Step S12), and, if it is the first command for the movement to origin, sets a predetermined operation time in a timer T to start time counting (Step S13). This operation time has to be a time period during which the screw 7 can reach the origin even if molten resin having a high viscosity remains within the injection cylinder 6.

Subsequently, the CPU 115 for CNC repeatedly executes the determination processings in Steps S14 to S16. More particularly, the CPU 115 for CNC determines whether or not the screw 7 reaches the origin before the operation time of timer T elapses, that is, whether or not the resin in the injection cylinder 6 is melted and the movement of screw 7 is possible (including the case where resin is absent in the injection cylinder 6), or whether or not the resin in the injection cylinder 6 is solidified completely and the movement of the screw 7 is impossible (Steps S14 to S16).

Instead of determining whether or not the resin is melted in Steps S14 to S16, the temperature of the injection cylinder 6 may be detected to determine whether the temperature thereof is a temperature at which the resin is melted.

First, when the resin in the injection cylinder 6 is melted and the movement of the screw 7 is possible (including the case where resin is absent in the injection cylinder 6), that is, when the screw 7 reaches the origin before the operation time of timer T elapses and the decision in Step S15 is Yes, the CPU 115 for CNC succeedingly outputs a movement command which is necessary to move the screw 7 from the origin to the retreat limit (Step S17, movement of a2 shown in FIG. 3), verifies the movement to the retreat limit (Step S18), again outputs a movement command to move the screw 7 from the retreat limit to the initial current position Ps of screw (Step S19, movement of a3 shown in FIG. 3), verifies the movement to the initial current position Ps of screw (Step S20), and determines whether or not the value of the counter C for counting the number of reciprocating motion of the screw 7 has reached a predetermined number of reciprocating operations Cx (Step S21).

If the predetermined number of reciprocating motions Cx is set at a value not lower than 2, the screw 7 can be reciprocated in the injection cylinder 6 a plurality of number of times with full stroke by the repeated processing in the above-mentioned Steps S10 to S21, so that a considerable amount of melted resin in the injection cylinder 6 can be discharged (in the case where resin is present in the injection cylinder 6). However, since the value of counter C is 2 or higher in the reciprocating operation for the second time and there after, the processings in Steps S13 and S14, which are necessary to determine whether or not the movement of the screw 7 is possible, are not executed. If the first movement to the origin is possible, it is apparent that the resin is melted (including the case where resin is absent in the injection cylinder 6), so that the processings in Steps S13 and S14 need not be repeated.

On the other hand, when the solidification of resin (or very high viscosity) is found in the first movement to the origin, that is, when the screw 7 has not reached the origin even if the operation time of timer T has elapsed, and the decision in Step 14 is Yes, the screw 7 cannot be moved or can be moved only slightly, so that it is meaningless to output a screw retreat command. In this case, therefore, the CPU 115 for CNC omits the processing for both the screw movement to the origin during execution and the screw movement to the retreat limit, outputs a command for movement to the initial current position Ps of screw, verifies the screw movement to the initial current position Ps of screw (Steps S48 and S49), and sets 1 in flag F provided for storing the solidified state of resin, thereby storing that the resin has been solidified completely (Step S50).

After the CPU 115 for CNC makes the screw 7 perform reciprocating motion and return movement to the initial current position Ps (in the case where the resin melts and the processing on a path passing the connecting point ② has been performed) or makes the screw 7 return to the initial current position Ps by omitting the movement to the origin (in the case where the resin solidifies and the processing on a path passing the connecting point ① has been performed) depending on the melting state of resin, the CPU 115 for CNC sets torque limit T2 in the servo CPU 110 to limit the driving force of the servomotor M1 for injection to a low output (Step S22).

However, the aforesaid torque limit T1 is a force of such a degree that the screw 7 or the driving system thereof is not damaged even if a movement command is output when the resin is in solid state and that the screw 7 can be moved with full stroke even when the melted resin remains in the injection cylinder 6, while the torque limit T2 is a force of such a degree as to be necessary to verify the reaction force such as viscosity resistance of resin, so that the relationship of T1>T2 holds.

The CPU 115 for CNC, which has set the torque limit T2, outputs a movement command to advance the screw 7 from the initial current position Ps of screw by a preset amount S (Step S23, movement of a4 shown in FIG. 3), sets a predetermined operation time in the timer T to let the timer start time counting (Step S24), waits until the operation of timer T is finished (Step S25), and reads the current screw position Qf and stores it as the first stop position after the predetermined operation time has elapsed (Step S26).

When the resin in the injection cylinder 6 melts considerably or when the resin is absent in the injection cylinder 6, the screw 7 can advance by the amount S of movement command by overcoming the resistance of resin (the position to be reached by the movement in this case is indicated by Pf in FIG. 3). However, when the resin in the injection cylinder 6 melts insufficiently and the resin reaction force and the viscosity resistance are high, the screw 7 cannot advance by the amount S of movement command by overcoming the resistance of the resin. In such a case, the advance of the screw 7, is stopped at a position where the resin reaction force, viscosity resistance, etc. acting to retreat the screw 7, which increases in proportion to the volume contraction of resin caused by the advance of the screw 7, balance with a driving torque to advance the screw 7 (an example of position to be reached in this case is indicated by Qf in FIG. 3).

When the resin in the injection cylinder 6 has solidified completely, the screw 7 itself will not move substantially, and only the servomotor M1 for injection can rotate within the allowable range of backlash.

In any case, the position detected as Qf is not the actual position of the screw 7 itself, but the rotational position of the servomotor M1 for injection.

The CPU 115 for CNC, which has thus detected the first stop position, makes the screw 7 return once to the initial current position Ps of screw to equalize the conditions at which the movement command is issued (Steps S27 and S28, movement of a5 shown in FIG. 3), outputs a movement command to retreat the screw 7 from the initial current position Ps of screw by a preset amount S (Step S29, movement of a6 shown in FIG. 3), sets a predetermined operation time in the timer T to start time counting (Step S30), waits until the operation of timer T is finished (Step S31), and reads the current screw position Qb and stores it as the second stop position after the predetermined operation time has elapsed (Step S32).

As described previously, when the resin in the injection cylinder 6 melts considerably or when the resin is absent in the injection cylinder 6, the screw 7 can retreat by the amount S of the movement command by overcoming the negative resistance of resin acting in the advancing direction of the screw 7 (the position to be reached in this case is indicated by Pb in FIG. 3). However, when the resin in the injection cylinder 6 melts insufficiently, the screw 7 cannot retreat by the amount S of the movement command by overcoming the negative resistance of the resin. In such a case, the retreat of the screw 7 is stopped at a position where the resin reaction force, viscosity resistance, etc., which induces the screw 7 to advance, increase in proportion to the cubic expansion of resin caused by the retreat of the screw 7, balance with a driving torque to cause the screw 7 to retreat (an example of a position to be reached in this case is indicated by Qb in FIG. 3).

When the resin in the injection cylinder 6 has solidified completely, the screw 7 itself will not move substantially, and only the servomotor M1 for injection rotates within the allowable range of backlash.

In any case, the position detected as Qb is not the actual position of the screw 7 itself, but the rotational position of the servomotor M1 for injection.

Thus, the CPU 115 for CNC, which has detected the first stop position Qf and the second stop position Qb as described previously, carries out the processing to move the actual position of the screw 7 to a position at which the resin reaction force balances, or the processing to move the rotational position of the servomotor M1 for injection to an intermediate position of backlash.

The CPU 115 for CNC first divides the sum of Qf and Qb by 2 to determine the rotational position Pm of the servomotor M1 for injection corresponding to the actual position of the screw 7 at which the resin reaction force balances (Step S33).

That is, assuming that a backlash of Da is present between the screw 7 and the servomotor M1 for injection, the value of the first stop position Qf of the screw 7 on the number line is not actually the value of Qf but the value of Qf+Da (the backlash amount Da on the number line acts in the positive direction because the movement from Ps to Qf is a movement in the negative direction). Also, the value of the second stop position Qb of the screw 7 on the number line is not actually the value of Qb but the value of Qb−Da (the backlash amount Da on the number line acts in the negative direction because the movement from Ps to Qb is a movement in the positive direction). In order to determine the actual position of the screw 7 at which the resin reaction force acting on the screw 7 balances, it is necessary to take the mean value of the true positions of Qf and Qb. As described above, the backlash Da acts in the directions in which it is canceled with each other, so that the backlash amount Da need not be considered in the actual calculation.

In effect, [(Qf+Da)+(Qb−Da)]/2 and (Qf+Qb)/2 are consequently the same, so that the true position of the screw 7 at which the resin reaction force balances can be determined by (Qf+Qb)/2 from the reading based on the rotational position of the servomotor M1 for injection.

Next, the CPU 115 for CNC outputs the determined rotational position Pm as a movement command to rotate the servomotor M1 for injection and to move the screw 7 to the intermediate position Pm (Steps S34 and S35).

According to the above processing, even if the resin melts and any resin reaction force acts, the screw 7 can be moved to a position at which the resin reaction force balances to remove the resin reaction force, and the servomotor M1 for injection can be moved to the intermediate position of overall backlash in the power transmitting system between the screw 7 and the servomotor M1 for injection. Furthermore, when the resin has solidified completely and the screw 7 is stopped, no resin reaction force acts on the screw 7, so that by neglecting the resin reaction force, the servomotor M1 for injection can be moved to the intermediate position of overall backlash in the power transmitting system between the screw 7 and the servomotor M1 for injection.

These two states are the same in that the servomotor M1 for injection can rotate freely in the range of backlash without affecting the operation of the screw 7. In either case, the servomotor M1 for injection is positioned at the intermediate position of overall backlash in the power transmitting system between the screw 7 and the servomotor M1 for injection. That is, the servomotor M1 for injection can rotate in both the normal and reverse directions by a half amount of overall backlash amount, for example, Da/2, without affecting the position of the screw 7 at all, in other words, without causing the screw 7 to be affected by a resin reaction force.

However, as described above, in order to clarify the effect of the resin reaction force on the screw 7, it should be noted that, actually, the servomotor Ml for injection and the screw 7 are not connected directly to each other, and there are various components such as the timing belt for driving the ball screw 8, ball screw 8, and ball nut 9 on the power transmitting path between the servomotor M1 for injection and the screw 7, and that the cumulative value of the backlashes occurring among these components acts as the overall backlash amount. Therefore, for example, even if the screw 7 is moved from the second stop position to the intermediate position Pm and then the servomotor M1 for injection is rotated in the reverse direction by a half amount of overall backlash amount, the axial contact between the ball screw 8 and the ball nut 9 is not always cut off, and the contact between the ball screw 8 and the ball nut 9 is sometimes maintained.

This is because when the servomotor M1 for injection is rotated in the reverse direction, the backlashes are eliminated in the order of the backlash between the timing belt for driving the ball screw 8 and the servomotor M1 for injection, the backlash between the timing belt and the ball screw 8, and the backlash between the ball screw 8 and the ball nut 9, and the backlash between the ball screw 8 and the ball nut 9 is eliminated last, so that sometimes the ball screw 8 is not rotated adequately in the reverse direction.

In particular, according to the present embodiment, the final operation for positioning to the intermediate position Pm is performed by moving the screw in the negative direction, and so, if the axial contact between the ball screw 8 and the ball nut 9 is maintained in a state such that the servomotor M1 for injection is rotated in the reverse direction by a half amount of backlash amount, there is a possibility that a stress acts on the load cell 10. Naturally, in order to remove all external forces from the load cell 10, the axial contact between the ball screw 8 and the ball nut 9 must be cut off.

Thus, when the flag F is "0" and the resin is in a melted state (Step S36), the CPU 115 for CNC, which has completed the movement of the screw 7 to the intermediate position Pm on which no resin pressure is exerted, releases the torque limit of the servomotor M1 for injection (Step S37), and determines the initial value A of amplitude by adding a preset value $\alpha$ to the magnitude of movement (Qb−Pm) by which the motor M1 can be made to rotate in the normal and reverse direction on the basis of the position of the servomotor M1 for injection corresponding to the intermediate position of overall backlash amount (Step S38).

Since (Qb−Pm)=(Pm−Qf), A=Qb−Pm+$\alpha$=Pm−Qf+$\alpha$.

When the resin has melted and the screw 7 can be moved, the value of (Qb−Qf) is larger than the overall backlash amount Da, so that, in such a case, the screw 7 itself actually reciprocates. It seems that such an operation, causing the screw 7 itself to reciprocate, conflicts with the technical concept such that an external force exerted on the screw pusher plate 3 from the screw 7 is removed to stably stop the screw pusher plate 3 by positioning the screw 7 at the position Pm at which the resin reaction force balances, and the axial contact between the ball screw 8 and the ball nut 9 is cut off using the overall backlash between the servomotor M1 for injection and the ball nut 9, thereby removing all external forces acting on the load cell 10; however, this operation actually is effective for surely removing the resin reaction force acting on the screw 7 (since, at this stage, the torque limit of the servomotor M1 for injection is canceled as described previously, the screw 7 can be moved beyond the advance limit Qf or the retreat limit Qb at the time of torque limit T2).

Theoretically, the resin reaction force acting on the screw 7 can be removed completely by moving the screw 7 to the intermediate position Pm between the first stop position Qf and the second stop position Qb. However, in each of the screw movement processes such as the screw movement from the initial current position Ps of the screw to the first stop position Qf (movement of a4 shown in FIG. 3), the screw movement from the first stop position Qf to the initial current position Ps of the screw (movement of a5 shown in FIG. 3), the screw movement from the initial current position Ps of the screw to the second stop position Qb (movement of a6 shown in FIG. 3), and the screw movement from the second stop position Qb to the intermediate position Pm, especially in a state in which the resin does not solidify completely, the movement of the screw 7 itself brings about a change in the relationship between the injection cylinder 6, the screw 7, and the resin, so that, finally, even if the screw 7 is moved to the intermediate position Pm, at which the resin pressure is supposed to balance, the resin reaction force cannot actually be prevented completely from acting on the screw 7 in some cases.

In effect, in order to determine the screw position at which the resin pressure balances, the limit position Qf to which the screw can advance and the limit position Qb to which the screw can retreat must be detected by moving the screw 7. However, the movement of the screw 7 itself gives rise to a problem such as the change in the environmental condition of the resin.

Thus, the screw 7 is positively reciprocated with a small amplitude, with respect to the intermediate position Pm being the center of the reciprocation, in order to make the melted resin snugly fit the injection cylinder 6 and the screw 7, thereby removing the residual resin reaction force acting on the screw 7 more effectively. Since the center of reciprocation is always the intermediate position Pm, the state of melted resin is changed so that the resin pressure acting on the screw 7 becomes zero in a state in which the screw 7 is positioned at Pm. As a means for determining the value A to set a value slightly higher than (Qb−Qf), (Qb−Qf) being a half of the distance between the first stop position and the second stop position, as the initial value of amplitude, a method in which the calculation of (Qb−Pm)+α a is made and a method in which the calculation of (Qb−Pm)·β is made are available (however, β is a value slightly larger than 1).

If it is found in Step S36 that the flag F is "1" and that the resin has solidified or has a high viscosity, a torque limit value T3 is set to limit the output of the servomotor M1 for injection to a low output, and the amplitude A is set to (Qb−Pm) (Steps S39 and S40). The torque limit value T3 should have the relationship of T3>T2.

The CPU 115 for CNC, after having determined the initial value of amplitude A, outputs a movement command to advance the screw 7 from the intermediate position Pm by the amplitude A and verifies the movement of the screw 7 to the commanded position (Steps S41 and S42, movement of a8 shown in FIG. 3), and then outputs a movement command to retreat the screw 7 from the intermediate position Pm by the amplitude A and verifies the movement of the screw 7 to the commanded position (Steps S43 and S44, movement of a9 shown in FIG. 3).

One cycle of the reciprocating motion, with respect to the intermediate position being the center, is performed by the processings in Steps S41 through S44, and the magnitude of amplitude is A or the initial value of (Qb−Pm)+α.

Next, the CPU 115 for CNC determines whether or not the current value of amplitude A is lower than a preset value δ (Step S45). If it is found that the current value is not smaller than δ, this amplitude A is multiplied by a preset value B to obtain a new amplitude A (Step S46), and the processing in Step S41 and the subsequent steps are repeatedly executed in the same way as described above based on this amplitude A, thereby causing one cycle of reciprocating operation of the screw 7 to be performed with respect to the intermediate position Pm being the center (movements of a10 and all shown in FIG. 3).

Since the preset value B is a preset value for gradually decreasing the amplitude of the screw 7, the allowable setting range thereof is naturally 0<B<1, and in this embodiment, a value of 0.9 is employed. Also, since this reciprocating motion must be continued until the amplitude becomes smaller than ½ of the backlash amount Da, the preset value δ must be a value not larger than Da/2.

During the repeated execution of the processing in Steps S41 to S46, the value of the amplitude A decreases gradually. When this value becomes lower than ½ of the backlash amount Da, the reciprocating motion of the screw 7 itself stops at the intermediate position being the center of the reciprocating motion. Then, a state is established in which the melted resin snugly fits the injection cylinder 6 and the screw 7 so that the resin reaction force will not act at all on the screw 7, thereby enabling the screw pusher plate 3 to be stopped completely and stably at this position.

If the value of the amplitude A becomes lower than a half of the backlash amount, Da/2, the ball screw 8 cannot be rotated to a backlash elimination position at which the normal and reverse rotation of the ball screw 8 is directly transmitted to the ball nut 9 as the advance force of the screw 7 or a backlash elimination position at which the normal and reverse rotation of the ball screw 8 is directly transmitted to the ball nut 9 as the retreat force of the screw 7, so that the substantial axial contact between the ball screw 8 and the ball nut 9 is cut off.

In this state, the ball screw 8 is completely separated from the ball nut 9 in the axial direction, that is, the ball screw 8 is not in contact with the ball nut 9, so that neither a force with which the ball nut 9 pushes the load cell 10 nor a force with which the ball nut 9 pulls the load cell 10 will act on the ball screw 8. Further, the screw 7 itself is not subjected to the resin reaction force at all, and the screw pusher plate 3, which fixes the load cell 10, rests completely and stably, so that there is no substantial disturbance acting on the load cell 10.

In this embodiment, in which the load cell 10 is arranged between the ball nut 9 and the screw pusher plate 3 or the final position on the power transmitting path, when the magnitude of the amplitude becomes smaller than the overall backlash amount Da, the reciprocating motion can be stopped immediately to make zero adjustment of the load cell 10. Actually, however, the preset value δ is set to a value lower than Da/2 taking into account some allowance for safety.

The CPU 115 for CNC, after detecting through the processing in Step S45 that the current value of the amplitude A is lower than the preset value δ and the reciprocating motion is finished, reads the detected current value of the pressure of load cell 10 through the CPU 107 for pressure monitoring, inverts the sign of the value, and stores the value in the correction value storage region of the RAM 102 (Step S47), thereby completing the zero adjustment processing.

For example, if the detected pressure of the load cell 10 is 10 kg/cm$^2$ despite the fact that the current value of amplitude A is lower than the preset value δ and the disturbance acting on the load cell 10 is zero, this means that a stress of 10 kg/cm$^2$ acts on the load cell 10 caused by error factors of the load cell 10 itself including the plastic deformation of coating material and the change in air bubble state, so that −10 kg/cm$^2$ is stored in the correction value storage region of the RAM 102, and adjustment is made so that the pressure detected by the CPU 107 for pressure monitoring becomes zero when the disturbance acting on the load cell 10 is zero, that is, when a value of 10 kg/cm$^2$ is outputted from the load cell 10. As already described, the value detected as the resin reaction force by the CPU 107 for pressure monitoring through the sampling of the injection holding pressure and back pressure is a value obtained by adding a correction value to the output of the A/D converter 106. Therefore, the resin reaction force can be detected accurately regardless of the causes for error factors of the load cell 10 itself including the plastic deformation of coating material and the change in air bubble state.

However, the resin reaction force described here is a disturbance acting on the load cell 10 itself, and not the resin reaction force itself acting on the screw 7. When the resin reaction force itself acting on the screw 7 is to be detected accurately, the frictional resistances A1 and A2 acting between the tie rod 2 and the screw pusher plate 3, a frictional resistance acting between the screw 7 and the injection cylinder 6, etc. are hindrances to accurate detection, so that the correction value must be offset in a direction in which the error caused by these frictional resistances can be eliminated depending on advancing or retreating movement of the screw 7, that is, the direction of the stress or tension acting on the load cell 10.

If the detected pressure of the load cell 10, which is detected in the processing of Step S47, deviates extremely from zero being the reference, there is the possibility that some serious abnormality such as buckling of the load cell body 11 has occurred. Thus, if zero adjustment is made in such a state, the load cell 10 will not be able to function as expected, so that an abnormality detection signal should be outputted instead of the zero adjustment.

If the absolute value of the detected pressure of the load cell 10, which is read in the processing in Step S47, is not larger than a preset value and the deviation from zero point is of a negligible degree, the updating and storing of correction value, that is, a substantial adjusting operation may be omitted.

Further, in this embodiment, a file for storing the history of adjustment is provided in the nonvolatile memory 114 (see FIG. 8) so that the correction amount, correction date, number of shots during operation, integrated operation time of injection molding machine, etc. are stored in this file when the processing in Step S47 is finished. The file content can be displayed on the screen of the manual data input device 119 with display by the function menu selecting operation, so that the file content can be referred to whenever necessary.

Described above as an embodiment is the case where the load cell 10 is arranged between the ball nut 9 and the screw pusher plate 3, which is the final position on the power transmitting path. In some cases, however, the load cell 10 can be installed at a position closer to the servomotor M1 for injection on the power transmitting path, depending on the configuration of injection mechanism.

Comparing the case where the load cell 10 is located at the final position on the power transmitting path with the case where the load cell 10 is located at a position closer to the servomotor M1 for injection, the distribution of the overall backlash between the sections divided by the load cell 10 differs significantly depending on the location of the load cell 10 on the power transmitting path. For instance, there is little backlash between the load cell 10 and the screw 7 in the above-mentioned case, whereas a large backlash is present between the load cell 10 and the screw 7 in the case where the load cell 10 is installed at a position closer to the servomotor M1 for injection.

In the case where the load cell 10 is located at the position closer to the servomotor M1 for injection, even if the value of amplitude A is lower than ½ of the overall backlash amount Da, the external force acting on the load cell 10 does not necessarily become zero. However, as described previously, by continuing the reciprocating motion without stopping the reciprocating motion even after the magnitude of amplitude becomes smaller than ½ of the overall backlash amount, all the backlashes with respect to various components constituting the power transmitting path can be moved to the neutral positions of the backlashes, and the dynamic connection among the components can be cut off. Therefore, as long as δ is set at a low value, zero adjustment can be made by removing the external forces acting on the load cell 10 regardless of the location of the load cell 10 on the power transmitting path. Needless to say, from the viewpoint of the detection accuracy, it is most desirable to install the load cell 10 at a closest possible position to the screw 7 on the power transmitting path.

Further, if the aforesaid zero adjustment processing is executed when the automatic purge item is selected by the function menu using the manual data input device 119 with display, the zero adjustment of the load cell 10 can be made without fail at proper time intervals such as those required for the change of molded material. It is preferable to make zero adjustment after the resin in the injection cylinder 6 is discharged completely by executing the purging processing. However, in the case where the configuration is designed so that the automatic purge can be interrupted by actuation of an emergency switch for stopping all the functions of the injection molding machine, the execution of zero adjustment processing sometimes becomes impossible when the automatic purge is stopped for the convenience of the operator. Therefore, it is preferable to establish a sequence such that the zero adjustment processing can be executed by interrupting the purge operation before the start of automatic purge or after finishing the automatic purge of the first time, second time, etc. which have to always be executed.

In addition, the same processing operation can be applied to a pressure detector of an ejector rod or a movable platen.

According to the present invention, the external forces acting directly on movable members are removed completely by reciprocating the drive source of the movable members; backlashes having equal plays in the moving directions of the movable member are provided between the component on the power transmitting path, which directly drives the movable member on the power transmitting path ranging from the drive source to the movable member, and the movable member, by which the substantial force transmission between the movable member and the component is cut off; and the external pressure acting on the pressure detector is removed completely so that the zero adjustment of the pressure detector can be made in a state in which the disturbance is zero. Therefore, the zero adjustment of the pressure detector can be made simply and surely without requiring cumbersome work such as disassembling the injection molding machine for disengaging the pressure detector from other members of the injection.

Also, the processing operation necessary for the correction of the pressure detector is stored in the control unit of the injection molding machine so that the correction processing of the pressure detector can be executed together with the automatic purging operation. Therefore, the zero adjustment of the pressure detector can be made without fail at proper time intervals such as at the changing of molded material, and the injection holding pressure and the back pressure during metering can always be sampled with a properly calibrated pressure detector.

Further, an abnormality detection signal is generated when the absolute value of the correction amount of the output of pressure detector exceeds the preset amount. Therefore, even a serious abnormality, which cannot be corrected by a mere zero adjustment, can be detected.

Also, the history of zero adjustment including the date and correction amount of adjustment is stored in the control unit of the injection molding machine, and the stored history can be displayed. Therefore, the deterioration in performance and serious abnormality of the pressure detector can be found more easily.

We claim:

1. A method of adjusting a zero point of a pressure detector of an injection molding machine, for detecting a pressure exerted on a movable member of the machine, comprising the steps of:

(a) starting a reciprocating motion of the movable member, said motion having a gradually decreasing amplitude relative to a center point;

(b) stopping said reciprocating motion when said amplitude becomes a value not higher than a predetermined value;

(c) reading an output value of said pressure detector when said reciprocating motion is stopped in said step (b); and (d) correcting the output of said pressure detector based on the value read in said step (c).

2. A zero point adjusting method for a pressure detector of an injection molding machine according to claim 1, further comprising the steps of:

(e) outputting a command to a drive source for driving said movable member, for moving said movable member by a predetermined amount from a current position of said movable member by setting an output of said drive source to a low level, and then detecting a stop position of said movable member to store said stop position as a first stop position; and (f) outputting a command for moving said movable member to said drive source in a reversed direction by said preset amount from a current position of said movable member, and then detecting a stop position of said movable member to store said stop position as a second stop position, wherein said reciprocating motion in said step (a) is started with an intermediate point between said first and second stop positions as a center of said motion.

3. A zero point adjusting method for a pressure detector on an injection molding machine according to claim 2, wherein said reciprocating motion in said step (a) is started with an initial value of said amplitude not larger than ½ of a distance between said first and second stop positions and not smaller than ½ of an amount of backlash produced between said movable member and said drive source.

4. A zero point adjusting method for a pressure detector on an injection molding machine according to claim 2, wherein said reciprocating motion in said step (a) is started with an initial value of said amplitude, which is obtained by adding a preset value to ½ of the distance between said first and second stop positions.

5. A zero point adjusting method for a pressure detector of an injection molding machine according to claim 2, wherein said reciprocating motion in said step (a) is started with an initial value of said amplitude, which is obtained by multiplying ½ of the distance between said first and second stop positions by a number larger than 1.

6. A zero point adjusting method for a pressure detector on an injection molding machine according to claim 1, wherein said step (b) includes a step of stopping said reciprocating motion when said amplitude becomes smaller than ½ of the amount of backlash produced between said movable member and said drive source.

7. A zero point adjusting method for a pressure detector on an injection molding machine according to claim 1, wherein said drive source for driving said movable member comprises a servomotor having output limiting means.

8. A zero point adjusting method for a pressure detector on an injection molding machine according to claim 1, wherein said movable member comprises an injection screw.

9. A zero point adjusting method for a pressure detector of an injection molding machine according to claim 8, including the steps of carrying out an automatic purging and automatically executing said steps (a) to (d).

10. A zero point adjusting method for a pressure detector on an injection molding machine according to claim 1, including a step of outputting an abnormality detection signal when an absolute value of a correction amount of the output value of said pressure detector exceeds a preset amount.

11. A zero point adjusting method for a pressure detector of an injection molding machine according to claim 1, further comprising a step of storing a history of the zero adjustment including a date and a correction amount of the output value of said pressure detector in a controller of the injection molding machine and displaying the stored history.

12. An apparatus for adjusting a zero point of a pressure detector of an injection molding machine, for detecting a pressure exerted on a movable member of the machine, comprising:

reciprocating motion control means for starting a reciprocating motion of the movable member, said motion having a gradually decreasing amplitude relative to a center point, and for stopping said reciprocating motion when said amplitude becomes a value not higher than a predetermined value; and correcting means for reading an output value of said pressure detector when said reciprocating motion is stopped, and correcting the output of said pressure detector based on the read value.

13. A zero-point adjusting apparatus for a pressure detector of an injection molding machine according to claim 12, wherein said reciprocating motion control means outputs a command to a drive source for driving said movable member, for moving said movable member by a predetermined amount from a current position of said movable member by setting an output of said drive source to a low level, and then detects a stop position of said movable member to store said stop position as a first stop position, and outputs a command for moving said movable member to said drive source in a reversed direction by said preset amount from a current position of said movable member, and then detects a stop position of said movable member to store said stop position as a second stop position, and said reciprocating motion is started with an intermediate point between said first and second stop positions as a center of said motion.

14. A zero-point adjusting apparatus for a pressure detector of an injection molding machine according to claim 13, wherein said reciprocating motion control means starts said reciprocating motion with an initial value of said amplitude not larger than ½ of a distance between said first and second stop positions and not smaller than ½ of an amount of backlash produced between said movable member and said drive source.

15. A zero-point adjusting apparatus for a pressure detector of an injection molding machine according to claim 13, wherein said reciprocating motion control means starts said reciprocating motion with an initial value of said amplitude, which is obtained by adding a preset value to ½ of the distance between said first and second stop positions.

16. A zero-point adjusting apparatus for a pressure detector of an injection molding machine according to claim 13, wherein said reciprocating motion control means starts said reciprocating motion with an initial value of said amplitude, which is obtained by multiplying ½ of the distance between said first and second stop positions by a number larger than 1.

17. A zero-point adjusting apparatus for a pressure detector of an injection molding machine according to claim 12, wherein said reciprocating motion control means stops said reciprocating motion when said amplitude becomes smaller than ½ of the amount of backlash produced between said movable member and said drive source.

18. A zero-point adjusting apparatus for a pressure detector of an injection molding machine according to claim 12, wherein said movable member is driven by a servomotor having output limiting means.

19. A zero-point adjusting apparatus for a pressure detector of an injection molding machine according to claim 12, wherein said movable member comprises an injection screw.

20. A zero-point adjusting apparatus for a pressure detector of an injection molding machine according to claim 19, wherein said reciprocating motion control means carries out an automatic purging and executes the start and stop of said reciprocating motion automatically.

21. A zero-point adjusting apparatus for a pressure detector of an injection molding machine according to claim 12, further comprising abnormality detection signal output means for outputting an abnormality detection signal when an absolute value of a correction amount of the output value of said pressure detector exceeds a preset amount.

22. A zero-point adjusting apparatus for a pressure detector of an injection molding machine according to claim 12, further comprising a display device for storing a history of the zero adjustment including a date and a correction amount of the output value of said pressure detector in a controller of the injection molding machine and displaying the stored history.

* * * * *

UNITED STATES PATENT AND TRADEMARK OFFICE
CERTIFICATE OF CORRECTION

PATENT NO.:       5,997,780
DATED      :      December 7, 1999
INVENTOR(S):     Susumu ITO, et al.

It is certified that error appears in the above-identified patent and that said Letters Patent is hereby corrected as shown below:

On the Title Page:
[86]   In both occurrences, change "June 23, 1997" to --June 25, 1997--.

Figure 7:
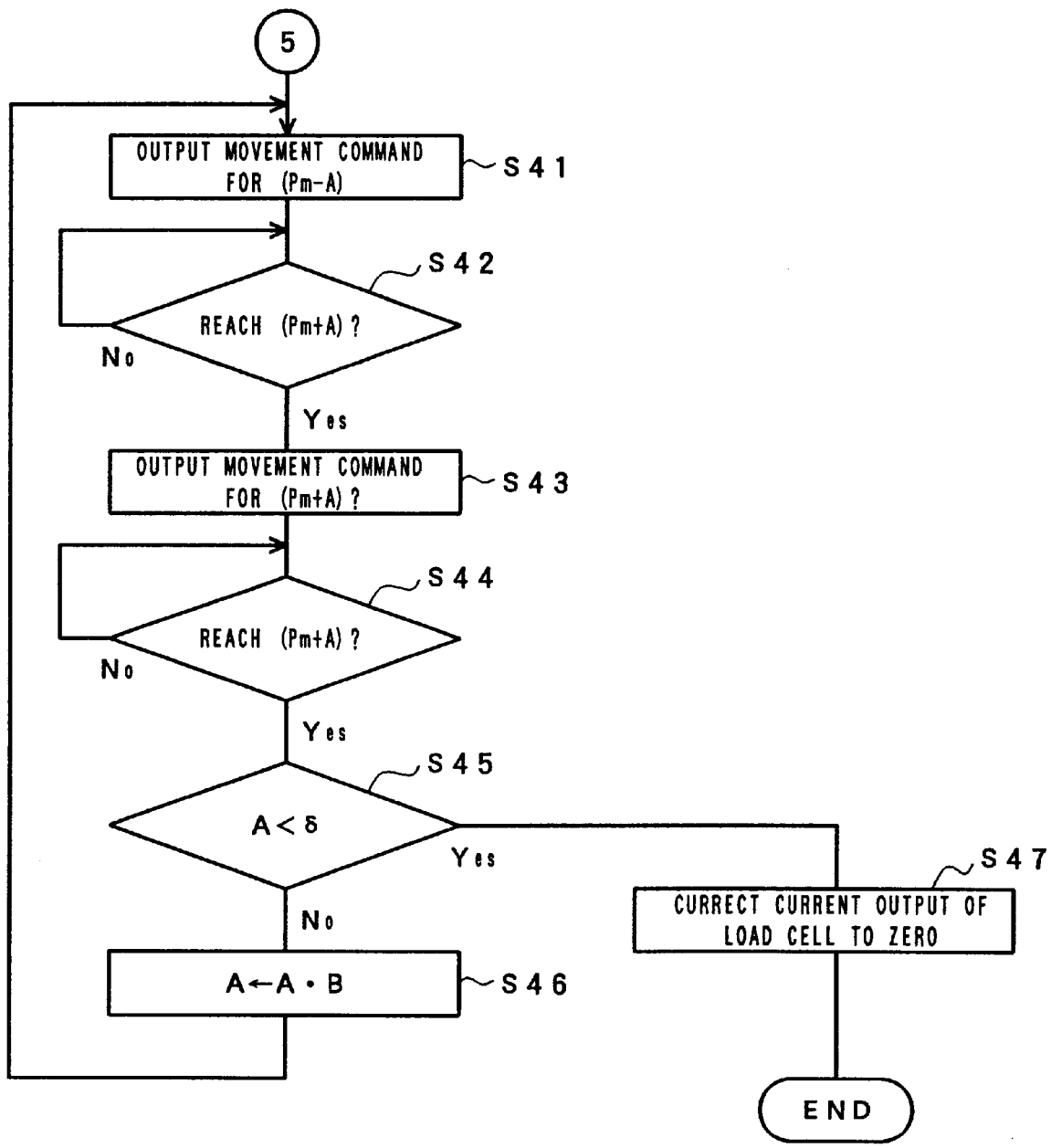
FIG. 7 is a continued flowchart showing the zero adjustment procedure.

In the Drawings:
FIG. 7,    block S47,    change "CURRECT" to --CORRECT--.

Column 10,   line 7,   change "them" to --then--; and
              line 32, change "(3/2)" to --(½)--.
Column 11,   line 12, change "arbitrary" to --arbitrarily--; and
              line 45, change "normal" to --reverse--.
Column 24,   line 33, delete "of the injection".

Signed and Sealed this

Twenty-second Day of August, 2000

Attest:

Q. TODD DICKINSON

Attesting Officer        Director of Patents and Trademarks